United States Patent [19]
Javitt et al.

[11] Patent Number: 6,002,677
[45] Date of Patent: *Dec. 14, 1999

[54] METHOD AND APPARATUS FOR TRANSMITTING HIGH RATE PACKET DATA OVER UNDER-UTILIZED VIRTUAL CIRCUITS

[75] Inventors: Joel I. Javitt, Hillside; J. Frederick Stevenson, Blairstown, both of N.J.

[73] Assignee: AT&T Corporation, New York, N.Y.

[*] Notice: This patent issued on a continued prosecution application filed under 37 CFR 1.53(d), and is subject to the twenty year patent term provisions of 35 U.S.C. 154(a)(2).

[21] Appl. No.: 08/699,275

[22] Filed: Aug. 19, 1996

[51] Int. Cl.⁶ ........................................................ H04J 1/16
[52] U.S. Cl. .............................. 370/329; 370/343; 455/62
[58] Field of Search ..................................... 370/312, 318, 370/328, 329, 330, 332, 341, 343, 480, 482, 487, 490, 493; 455/39, 507, 509, 515, 516, 517, 522, 62, 69, 70, 71

[56] References Cited

U.S. PATENT DOCUMENTS 5,408,681  4/1995  Ressler et al. ............................ 455/17
5,784,363  7/1998  Engstrom et al. ....................... 370/332

*Primary Examiner*—Chi H. Pham
*Assistant Examiner*—Kwang B. Yao
*Attorney, Agent, or Firm*—Kenyon & Kenyon

[57] ABSTRACT

A wireless communications system and method for providing simultaneous multi-channel packet data communications to a single user for given services without compromising system performance and efficiency. The system has at least one base station that transmits to at least one of a plurality of receiver stations over a given set of carrier frequencies, wherein each base station keeps of list of optimal frequencies over which a given receiver station would reliably receive data packets transmitted from the base station without the need for an increase in carrier energy. In one embodiment the system maintains a queue for each terminal to which data packets will be delivered. The data packets can be delivered over voice-dedicated and/or data packet dedicated frequencies at one time. In any event, however, when transmitting on voice-dedicated frequencies, the queued data packets are transmitted during voice inactivity periods. In another embodiment, both the base station and the receiver stations or terminals are capable of transmitting different packet data simultaneously over different frequencies.

2 Claims, 2 Drawing Sheets

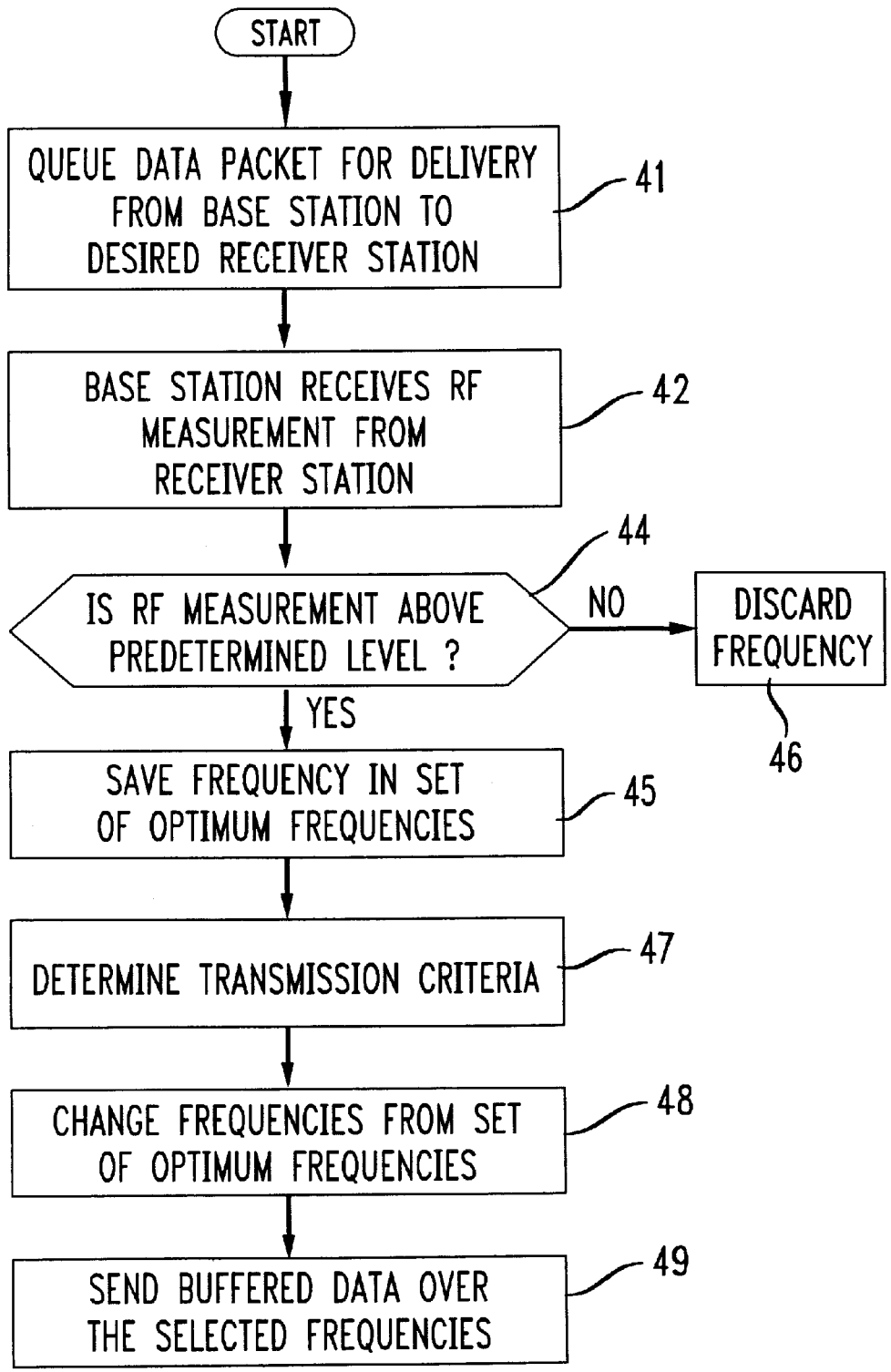

METHOD AND APPARATUS FOR TRANSMITTING HIGH RATE PACKET DATA OVER UNDER-UTILIZED VIRTUAL CIRCUITS

FIELD OF THE INVENTION

This invention relates to communications systems, and more particularly to wireless communications systems.

BACKGROUND OF THE INVENTION

Although communication systems take many forms, the general purpose of a communication system is to transmit information from a source to a destination located some distance away. As a result, communication systems basically consist of a transmitter, a channel and a receiver. The function of the transmitter is to process some original message (i.e. information to be communicated) into a form suitable for transmission over the channel. The channel, in turn, provides a physical connection between the transmitter and the receiver so that the message can be communicated therebetween. The receiver, therefor, has the function of processing the received signal and reproduce the original message.

Before transmitting the original message, however, the transmitter must manipulate the original message into a form suitable for transmission over the channel. The process of manipulating the original message into a transmission signal is called modulation. In general, modulation involves varying some parameter of a carrier wave with the message signal in such a way that the spectrum of the modulated wave matches the bandwidth of the channel over which the message is communicated. Once modulated, the signal is transmitted over the channel to the receiver, which, as stated above, recreates the original signal from the modulated signal. This process is called demodulation. As a result, communications systems can be said to transmit information through a series of modulation/demodulation processes over the channel.

Heretofore, wireless communications systems are configured to transmit packet data from a transmitting unit to a receiving unit over a single dedicated channel. That is, in packet data wireless systems the transmitting unit and receiving unit communicate over a single channel dedicated to the transmission of data. This configuration was developed to reduce software and hardware complexity at the terminal and network side, as well as minimize possible disruption to any incumbent voice communication system. Thus, the overall data rate of such present day system is limited to the data rate supported by that given single channel.

With the advent of more varied and customized wireless user services, such present day systems have come under pressure to provide ever increasing bit rates. Moreover, those skilled in the art have found that such present day systems do not adequately provide the desired services (i.e. bit rates) without sacrificing system performance and efficiency. Thus, there is a need for a wireless packet data communication system that enables high-rate packet data communications between communicating units, without sacrificing system performance and efficiency.

SUMMARY OF THE INVENTION

Accordingly, the present invention is directed to a wireless communications system that provides high packet data rates without compromising system performance and efficiency. To attain this, the present invention provides a method and apparatus for providing multi-channel packet data communications to a single user.

In one embodiment, a wireless communications system is configured with one base station that transmits to one of a plurality of receiver stations over a given set of carrier frequencies at a given time. In general, a list of optimal frequencies is determined for transmitting packet data from the base station to a given receiver station. The optimal frequencies represent the set of channels through which the base station can successfully transmit packet data to the receiver station without having to increase the carrier energy over some predetermined carrier energy level. These data packets are delivered to the receiver station over any number of frequencies selected from the list of optimal frequencies. Since such frequencies can be voice-committed or data packet committed frequencies, the data packet delivery can be over a voice-committed frequency, a data-committed frequency, or a combination of voice-committed and data-committed frequencies. In any event, the wireless communication system of the present invention provides the ability to utilize a plurality of channels (i.e. frequencies) at any given time, to transmit packet data to a single user. Thus, the present invention overcomes to a large extent the limitations of the prior art.

These and other features of the invention are described in more detail in the following detailed description of the embodiments of the invention when taken with the drawings. The scope of the invention, however, is limited only by the claims appended hereto.

BRIEF DESCRIPTION OF THE DRAWINGS

FIG. 2 is a block diagram illustrating the steps for providing the multi-channel communications to a single user.

DETAILED DESCRIPTION OF ILLUSTRATIVE EMBODIMENTS OF THE INVENTION

Figure 1:
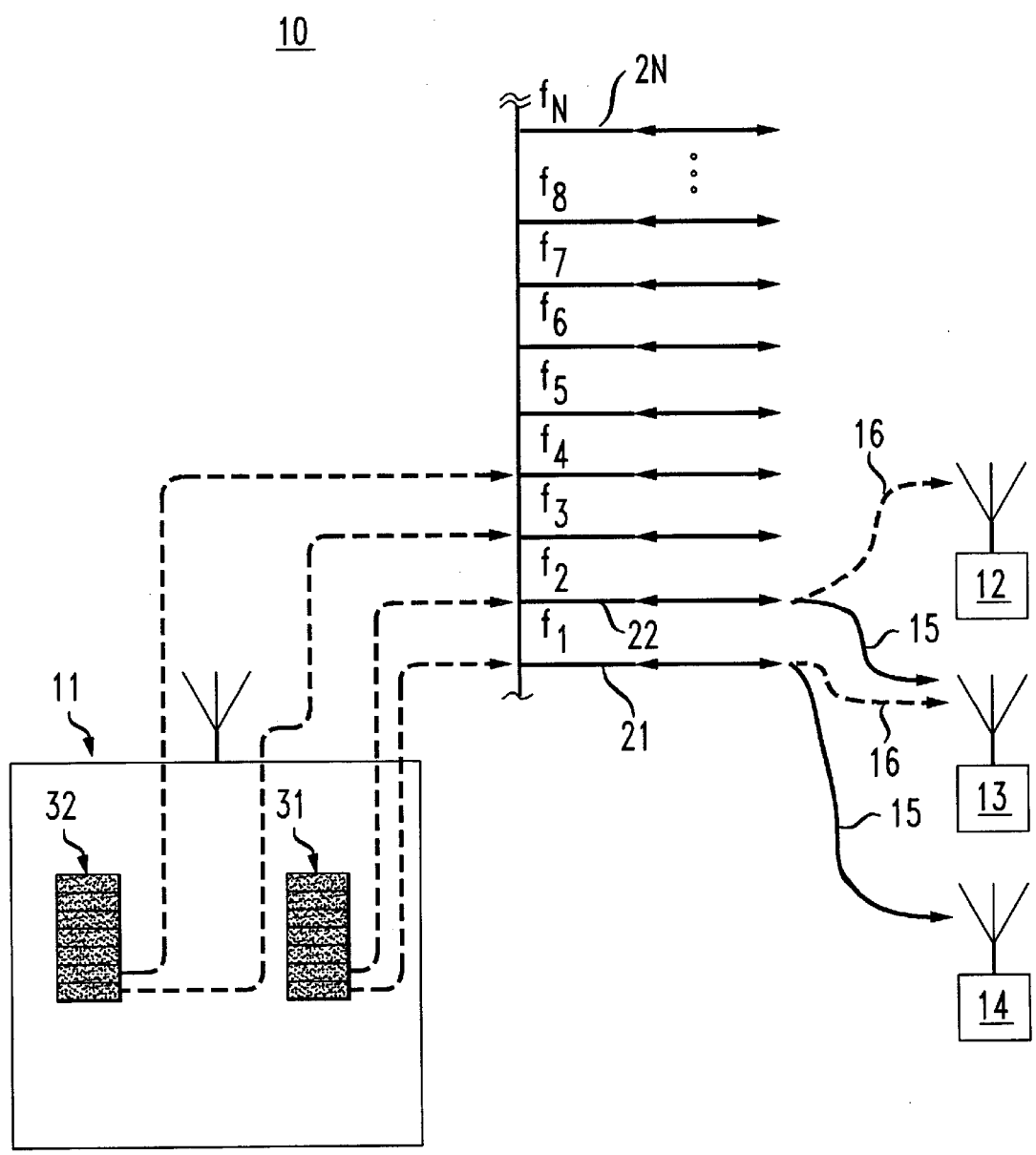
FIG. 1 is an illustrative embodiment of a wireless communications system providing multi-channel communications to a single user according to the present invention.

Referring now to FIG. 1, there is shown one embodiment of a wireless communications system providing multi-channel communications to a single user according to the present invention, hereinafter referred to as system 10. As shown, system 10 has a base station 11 communicating with receiver stations 12–14 over a given set of available frequencies 21–2N which form communications paths 15 and 16. Communications paths 15 are the first paths formed when the base station 11 transmits data packets to receiver stations 12–14. Communications paths 16 are formed when base station 11 transmits packet data to receiver stations 12–14 through a second path, simultaneous with the first path. Base station 11 has a separate buffer 31 and 32 dedicated to each receiver station 13 and 14, respectively. That is, buffer 31 is dedicated to receiver station 13 and buffer 32 is dedicated to receiver station 14.

In operation, base station 11 is operable to maintain a list of optimal frequencies for each receiver station to identify the frequencies over which the receiver stations 12–14 can receive a carrier signal having a signal level greater than a given level, wherein the given level can be predetermined to insure that a strong enough signal reaches the receiver unit for any given coding used to communicate thereto. As a result, base station 11 can select any of a plurality of frequencies from the list of optimal frequencies for a given unit when transmitting packet data to that given unit. Thus, enabling the simultaneous transmission of different data packets on different frequencies 21–2N to a single unit.

In one embodiment, base station 11 maintains a list of optimal frequencies over which packet data can be reliably transmitted from base station 11 to the receiver stations without increasing the carrier energy above a predetermined desired carrier level. That is, base station 11 keeps a separate list of optimal frequencies for each receiver station to which it communicates packet data. As a result, in determining whether a frequency is optimal for transmitting data to a particular receiver station, base station 11 must compare the actual carrier energy required to reliably send information over a particular frequency to a predetermined desired carrier level. As a result, the predetermined desired carrier level may be updated periodically by base station 11 or pre-set by software loaded in a controller housed in the base station.

In one method of measuring the actual carrier energy level required for reliable communications over the available frequencies, the receiver stations 12–14 first take RF level measurements for each radio frequency 21–2N over which data is received. The RF measurements are then reported to base station 11 which, in turn, determines whether the measured level is above the predetermined desired carrier level described above. Then, the base station identifies each frequency having a measured RF level above the predetermined desired level, and saves that frequency to the list of optimal frequencies, described above. As a result, base station 11 can maintain a list of optimal frequencies for each receiver station communicating on the system.

Buffers 31 and 32 are used to buffer packet data awaiting delivery from base station 11 to receiver stations 13 and 14, respectively. The buffered data can be transmitted from base station 11 to receiver stations 12–14 over any number of frequencies selected from the list of optimal frequencies. Since these optimal frequencies can be either voice-committed or packet data-committed frequencies on system 10, base station 11 can transmit the packet data over voice-committed frequencies, data-committed frequencies, or a combination of such frequencies at the same time. If, however, the selected frequency is voice-dedicated, base station 11 must insure that the packet data is sent only during inactive voice periods. In addition, prior to using voice-committed frequencies, base station 11 can send an escape sequence to instruct the receiver station to ignore the data and insert background noise. Moreover, to prematurely terminate a packet and insure that speech resumption is not delayed, base station 11 can send an escape sequence to the respective receiver station 12–14 to which it communicated the packet data. As a result, base station 11 should be operable to detect the end of a speech period and abruptly stop sending data packets over the inactive voice-committed channel. In any event, base station 11 can continuously monitor and updates the list of available frequencies that can be instantaneously seized for data transmission.

In one embodiment, the wireless communications system may be a fixed wireless access (FWA) system, comprised of a plurality of base stations and receiving stations, having full duplex voice communications paths using either discrete independent channels of a standard wireless air-interface protocol or virtual channels of a stacked carrier system. In such an embodiment, data packet communication from the base stations to the receiver stations may be accomplished through a high rate packet service (HRPS). The HRPS may be capable of voice, voiceband data, and FAX services, and may be operable to provide solely asymmetric communications services (e.g. downlink only) or alternatively to provide interactive communication service.

Referring now to FIG. 2 there is shown a block diagram of one method of providing multi-bearer path data communications in a wireless communication system. As shown, the packet data intended for delivery from a base station to a receiver station is queued in a dedicated buffer at step 41. The base station, at step 42, then receives RF measurements of the signal level for each available system frequency over which the base station can communicate the packet data to the receiver stations. The base station at step 44, then determines whether the received RF level is above some predetermined desirable level. If so, the frequency corresponding to that level is saved to a set of optimal frequencies, at step 45, otherwise the frequency is discarded at 46. Once, the set of optimal frequencies is determined, the desired transmission criteria is determined at step 47 (e.g. data only, simultaneous transmission, etc.). Once the transmission criteria is determined, the frequency or frequencies, over which the transmission criteria is satisfied, are chosen at step 48. Then, the buffered data is sent to the receiver station over the selected frequency or frequencies at step 49. This process can be repeated for each base unit communicating with each receiver station.

The above description includes exemplary embodiments and methods of implementing the present invention. References to specific examples and embodiments in the description should not be construed to limit the present invention in any manner, and is merely provided for the purpose of describing the general principles of the present invention. It will be apparent to one of ordinary skill in the art that the present invention may be practiced through other embodiments. For example, in another embodiment, the terminals 12–14, as shown in FIG. 1, may be operable to maintain a list of optimal frequencies for transmission form the terminals to the base station, thus providing efficient two-way communications over the available carrier frequencies.

What is claimed is:

1. A method for communicating data in a wireless communications system having a base station communicating to at least one of a plurality of terminals over a set of carrier frequencies, said base station being operable to transmit a predetermined data sequence to said given terminal to instruct said terminal to drop received data and insert background noise prior to said simultaneous transmission of said different data packets, the method comprising the steps of:

(a) periodically monitoring the carrier energy level of each said carrier frequency received at a given terminal to identify a list of optimal frequencies over which the carrier energy level is strong enough to maintain a viable transmission from said base station to said given terminal, wherein said viable transmission provides a given coding gain; and (b) simultaneously transmitting a given set of packet data from said base station to said given terminal over a plurality of frequencies from said list of optimal frequencies identified for said given terminal.

2. A wireless system for communicating packet data, comprising:

a base station; and a given set of carrier frequencies over which said base station and at least one terminal communicate said packet data;

each said terminal being operable to periodically monitor each frequency of said set of carrier frequencies to identify a list of optimal frequencies over which the carrier energy level is strong enough to maintain a viable transmission having a given coding gain;

said base station being operable to transmit simultaneously said packet data to a given terminal over a plurality of frequencies from said list of optimal frequencies identified by said given terminal; and wherein said base station is operable to transmit a predetermined data sequence to said given terminal to instruct said terminal to drop received data and insert background noise prior to said simultaneous transmission of said different data packets.

* * * * *